United States Patent
Sethuraman et al.

(10) Patent No.: US 11,082,525 B2
(45) Date of Patent: Aug. 3, 2021

(54) TECHNOLOGIES FOR MANAGING SENSOR AND TELEMETRY DATA ON AN EDGE NETWORKING PLATFORM

(71) Applicant: Intel Corporation, Santa Clara, CA (US)

(72) Inventors: Ramanathan Sethuraman, Bangalore (IN); Timothy Verrall, Pleasant Hill, CA (US); Ned M. Smith, Beaverton, OR (US); Thomas Willhalm, Sandhausen (DE); Brinda Ganesh, Portland, OR (US); Francesc Guim Bernat, Barcelona (ES); Karthik Kumar, Chandler, AZ (US); Evan Custodio, North Attleboro, MA (US); Suraj Prabhakaran, Aachen (DE); Ignacio Astilleros Diez, Madrid (ES); Nilesh K. Jain, Beaverton, OR (US); Ravi Iyer, Portland, OR (US); Andrew J. Herdrich, Hillsboro, OR (US); Alexander Vul, San Jose, CA (US); Patrick G. Kutch, Beaverton, OR (US); Kevin Bohan, Santa Clara, CA (US); Trevor Cooper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/415,138

(22) Filed: May 17, 2019

(65) Prior Publication Data

US 2019/0281132 A1    Sep. 12, 2019

(51) Int. Cl.
  *H04L 29/08* (2006.01)
  *H04L 29/06* (2006.01)
  *H04L 9/08* (2006.01)

(52) U.S. Cl.
  CPC .......... *H04L 67/303* (2013.01); *H04L 9/0825* (2013.01); *H04L 63/1408* (2013.01); *H04L 67/12* (2013.01)

(58) Field of Classification Search
  CPC . H04L 67/303; H04L 63/1408; H04L 9/0825; H04L 67/12; H04L 67/10; H04L 9/3297; H04L 9/3247; H04L 63/0428; H04L 63/123; H04W 12/02; H04W 12/10
  See application file for complete search history.

(56) References Cited

U.S. PATENT DOCUMENTS

| | | | |
|---|---|---|---|
| 7,490,073 B1 * | 2/2009 | Qureshi | G06F 11/079 706/50 |
| 9,910,470 B2 * | 3/2018 | Garg | G06F 1/26 |
| 2007/0078943 A1 * | 4/2007 | Daniels | G06F 15/16 709/217 |

(Continued)

*Primary Examiner* — Michael Won
(74) *Attorney, Agent, or Firm* — Hanley, Flight & Zimmerman, LLC

(57) ABSTRACT

Technologies for managing telemetry and sensor data on an edge networking platform are disclosed. According to one embodiment disclosed herein, a device monitors telemetry data associated with multiple services provided in the edge networking platform. The device identifies, for each of the services and as a function of the associated telemetry data, one or more service telemetry patterns. The device generates a profile including the identified service telemetry patterns.

19 Claims, 10 Drawing Sheets

(56) References Cited

U.S. PATENT DOCUMENTS

| | | | | |
|---|---|---|---|---|
| 2013/0204997 | A1* | 8/2013 | Eggleston | H04L 43/0882 709/223 |
| 2014/0277788 | A1* | 9/2014 | Forbes, Jr. | H02J 3/14 700/286 |
| 2016/0112263 | A1* | 4/2016 | Henry | G01R 31/58 370/250 |
| 2016/0287189 | A1* | 10/2016 | Modai | G16H 80/00 |
| 2017/0353367 | A1* | 12/2017 | Slaight | H04L 43/08 |
| 2018/0026913 | A1* | 1/2018 | Balle | G11C 5/02 709/226 |
| 2018/0309506 | A1* | 10/2018 | Reid | H04B 7/18597 |
| 2019/0044812 | A1* | 2/2019 | Loftus | H04L 41/0816 |
| 2019/0281078 | A1* | 9/2019 | Eguiarte Salazar | G06N 20/00 |
| 2019/0306011 | A1* | 10/2019 | Fenoglio | H04L 41/22 |
| 2020/0344252 | A1* | 10/2020 | Menon | G06F 16/906 |

\* cited by examiner

TECHNOLOGIES FOR MANAGING SENSOR AND TELEMETRY DATA ON AN EDGE NETWORKING PLATFORM

BACKGROUND

Edge computing provides techniques for processing resources at a location in closer network proximity to a requesting device, as opposed to a centralized location in a cloud network. Doing so ensures that devices receive critical data relatively quickly. For example, an edge device may include multiple sensors that collect various data, such as temperature measures over time. The edge device may transmit the sensor data to the edge network, and edge compute resources in the network further processes the sensor data. For instance, the compute resources may aggregate the sensor data with the sensor data of other devices. Continuing the example, the compute resources may analyze the aggregated data to generate a weather map in a smart city architecture.

Generally, each component in the edge network is subject to various performance requirements, such as those specified in a service level agreement (SLA), a quality-of-service (QoS) specification, and the like. For example, a QoS requirement may specify that edge device requests are to be serviced under a given latency measure. Performance monitors in the edge network may collect telemetry data from each component. Doing so allows orchestrators in the edge network to adjust resource allocation and usage accordingly to ensure that the performance requirements are satisfied.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
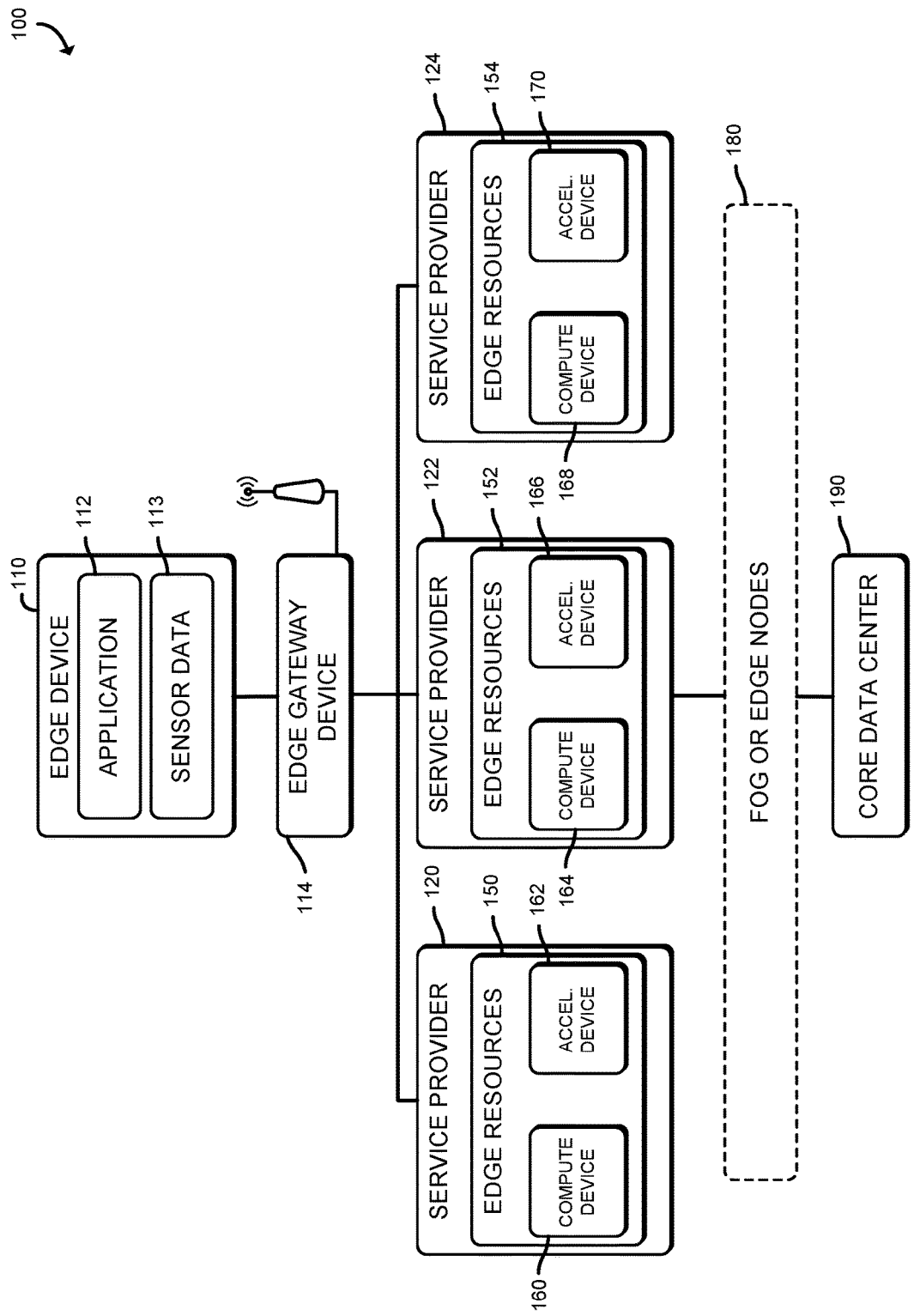
FIG. 1 is a simplified diagram of at least one embodiment of a system for managing sensor and telemetry data in an edge platform.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for managing sensor data and telemetry data in an edge platform is shown. The system 100 is representative of the edge platform. Illustratively, the system 100 includes an edge device 110 in communication with an edge gateway device 114. The edge gateway device 114 may be embodied as any device capable of communicating data between the edge device 110 and one or more edge resources 150, 152, 154 (e.g., resources, such as compute devices and the components thereof, owned and/or operated by one or more service providers 120, 122, 124, respectively, such as cellular network operators) or other compute devices located in a cloud. Further, the edge gateway device 114, in the illustrative embodiment, is configured to receive and respond to requests from the edge device 110 regarding characteristics of the edge resources 150, 152, 154, such as architectures of processors, accelerator devices, and/or other components in the edge resources 150, 152, 154 (e.g., in compute devices 160, 164, 168 and accelerator devices 162, 166, 170), latencies, power usage, and costs (e.g., monetary costs) associated with using those edge resources 150, 152, 154. The edge gateway device 114 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. Further, the system 100 may be organized in a hierarchical structure having multiple tiers. For example, a given tier may include the aforementioned edge computing devices, e.g., edge computing devices in locations that are of a similar network proximity to the edge device 110. A next tier may include cell towers and base stations providing edge resources. The following tier may include a central office station in a core data center 190.

It should be appreciated that, in some embodiments, the edge network may form a portion of or otherwise provide an ingress point into a fog network (e.g., fog or edge nodes 180), which may be embodied as a system-level horizontal architecture that distributes resources and services of computing, storage, control and networking anywhere between a core data center 190 (e.g., a data center that is further away from and in a higher level of the hierarchy of the system 100 than the edge resources 150, 152, 154, and that includes multiple compute devices capable of executing one or more services (e.g., processes on behalf of one or more clients)) and an endpoint device (e.g., the edge device 110).

In an embodiment, the edge device 110 executes an application 112 (e.g., using a processor and/or accelerator device(s)) included therein. The application 112 may include one or more services or workloads for processing. For example, assume that the edge device 110 is representative of an autonomous vehicle connected to the edge network forming the system 100. The application 112 may include various functions for ensuring normal operation of the autonomous vehicle, such as location, navigation, and other functions used to operate the vehicle. Further, the application 112 may request data from services provided by edge resources 150, 152, or 154. Generally, the edge gateway device 114 may receive such requests. The edge gateway device 114 may thereafter evaluate the request and forward the request to an appropriate service at an edge location operated by one of the service providers 120, 122, 124 (or to the fog or edge nodes 180 or core data center 190).

In addition, the edge device 110 may collect sensor data 113 from each of multiple sensors configured with the edge device 110. Continuing the example of an autonomous vehicle, sensors may include Light Detection and Ranging (LIDAR) sensors, global positioning system (GPS) sensors, temperature sensors, and so on. The edge device 110 may transmit sensor data 113 to the edge gateway device 114, which in turn may transmit the sensor data 113 to compute components in the system 100 (e.g., edge resources 150, 152, 154, fog or edge nodes 180, or the core data center 190) for further processing and analytics. In some cases, the edge gateway device 114 aggregates the sensor data 113 from multiple edge devices 110 prior to transmitting the sensor data 113 to the compute components.

Each of the service providers 120, 122, 124 may correspond to an entity, such as a telecommunications operator, that owns the respective edge resources 150, 152, 154. In some cases, a service provider 120, 122, 124 may rent out (or otherwise allow ownership or usage of) the respective edge resources 150, 152, 154 (or a partition thereof) to a third-party, also referred to herein as a "tenant." A tenant may correspond to another entity, such as a network provider, a cloud services provider, another telecommunications operator, and so on. In some cases, a given set of edge resources may be partitioned among multiple tenants.

As stated, the edge gateway device 114 may receive sensor data 113 from multiple edge devices 110. One concern with doing so is that, at times, sensor data 113 across multiple edge devices 110 may be redundant, resulting in noisy data being forwarded to the core data center 190. For example, the edge gateway device 114 may receive sensor data 113 from multiple sources relating to temperature from edge devices 110 in a certain vicinity. In such a case, the temperature sensor data received may have little to no variation between one another. However, forwarding such information to the core data center 190 without any filtering would result in additional network overhead.

Embodiments presented herein disclose techniques for correlating sensor data 113 arriving from multiple sensors and edge devices 110. As further described herein, a device, such as the edge gateway device 114, includes inline processing logic to identify correlative patterns from the multiple heterogeneous and homogeneous sensors. The edge gateway device 114 may forward the sensor data 113 thereafter as the identified patterns (e.g., embodied as vector data). Doing so reduces network load on edge components that frequently analyze sensor data (e.g., the edge resources 150, 152, 154, fog or edge nodes 180, the core data center 190, etc.).

In addition, each of the components of the system 100 (e.g., the edge gateway device 114, edge resources 150, 152, 154, fog or edge nodes 180, core data center 190, etc.) may be subject to one or more performance requirements. Such performance requirements may be specified by one or more service level agreements (SLA) or as one or more quality-of-service (QoS) requirements. For example, a QoS requirement may specify that an edge service request is to be processed within a given timeframe or that the request is subject to be processed under a given latency. Telemetry data allows an orchestrator (e.g., executing within the edge gateway device 114 or the core data center 190) to analyze workload performance and adjust resource allocation and usage as necessary.

Further, edge resources 150, 152, 154 may provide multiple heterogeneous services. Examples of services may include content delivery network (CDN) services, weather services, location services, and the like. Based on the type of service, usage of a set of edge resources can vary throughout different times of the day. For example, for a CDN service, resource usage may be relatively higher in the evening than towards the morning. By contrast, resource usage for a real-time analytics or navigation service may be relatively higher during the day than at night. Even further, each service may have different workload characteristics such as common cache and memory bandwidth usage patterns. Other differing characteristics may include a given workload using more solid state drive (SSD) bandwidth while another uses more memory bandwidth. Further still, a given type of service may use considerably more or less resources relative to another service. It is desirable to have the ability to discern telemetry data associated with each distinct service such that SLA and QoS requirements remain satisfied.

Embodiments presented herein also disclose techniques for providing service-aware telemetry in the edge platform. Telemetry data may be extended with metadata fields used to indicate a service of origin associated with the telemetry. The edge gateway device 114 may learn dynamics of the service performance based on the received telemetry data associated with that service and provide such information to an orchestrator (e.g., executing on the core data center 190), which in turn may preemptively perform actions in response to analyzing the service-aware telemetry data. Further, the edge gateway device 114 may generate workload profiles associated with each service, which allows the edge platform to predictively orchestrate workloads.

Another concern relating to collecting telemetry data relates to thermal properties of the edge resources. Function-as-a-Service (FaaS) services provided by edge resources 150, 152, 154 (e.g., accelerator devices 162, 166, 170 respectively) are often resource intensive, yet are subject to thermal constraints. As stated, components in the edge platform and the services themselves may be required to satisfy SLA and QoS requirements in the edge platform. However, thermal properties must also be observed to ensure that the components do not fail as a result of, e.g., overheating of the resources. Thermal telemetry data may be collected from each of the edge resources to identify a thermal load on the resources. It is desirable to use thermal telemetry data for effective resource allocation and "cost of execution" attribution in a SLA.

To address this, embodiments presented herein also disclose thermal-aware load balancing SLA and cooling management-based techniques. As described further herein, thermal telemetry is monitored in the edge resources. The monitored thermal telemetry data is evaluated against a corresponding threshold. The edge gateway device 114 may determine, from a SLA associated with the resources, whether a thermal budget for the resource is exceeded. If the budget is exceeded, then the edge device notifies an orchestrator, which then may implement one or more actions to reduce thermal load on the resources (e.g., using migration, allocating additional resources, etc.). Otherwise, the edge device performs one or more cooling techniques thereon.

Yet another concern related to collecting telemetry data relates to security and privacy associated with the telemetry data. As stated, edge resources 150, 152, 154 may be managed or otherwise owned by multiple tenants. It is desirable that telemetry data of edge resources registered to a particular tenant is accessible to only authorized entities, e.g., the owner of the edge resources, the tenant, etc.

To address this concern, embodiments presented herein also disclose techniques for managing access to telemetry data by a tenant associated with the underlying edge resources. The edge gateway device 114 may include interfaces that allow specifying access to telemetry data. A given interface allows for registering a tenant to a given partition or set of edge resources. The interface includes a public key of the tenant used for authenticating that tenant. Another interface allows for assigning access permissions to the telemetry data associated with the resources. Another interface allows tenants to access the telemetry. Once a tenant is registered using the provided interfaces, telemetry data is encrypted using the public key associated with that tenant. Doing so ensures that the tenant (or otherwise authorized entity) is able to access the telemetry data.

Figure 2:
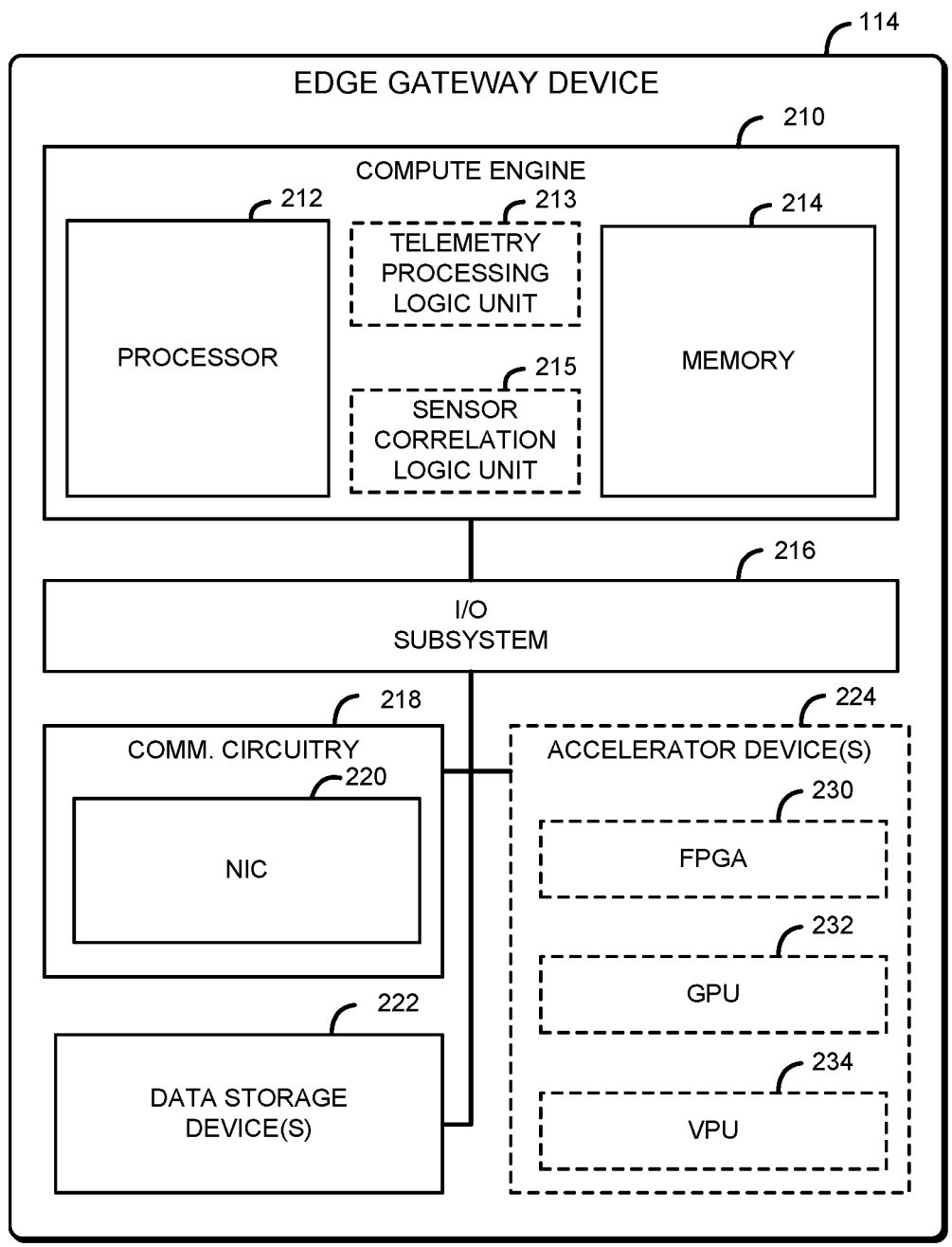
FIG. 2 is a simplified block diagram of at least one embodiment of an edge gateway device that may be included with the system described relative to FIG. 1.

Referring now to FIG. 2, a simplified block diagram of the edge gateway device 114 of FIG. 1 is shown. Although the edge gateway device 114 is depicted relative to FIG. 2, the following description of components discussed may also apply to those of other hardware devices of system 100. The illustrative edge gateway device 114 includes a compute engine (also referred to herein as "compute engine circuitry") 210, an input/output (I/O) subsystem 216, communication circuitry 218, and one or more data storage devices 222. Further, as described herein, the edge gateway device 114 may also include one or more accelerator devices 224. Of course, in other embodiments, the edge gateway device 114 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a telemetry processing logic unit 213, a memory 214, and a sensor correlation logic unit 215. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 214 may be integrated into the processor 212. In operation, the memory 214 may store various software and data used during operation such as one or more applications, data operated on by the application(s), libraries, and drivers.

The telemetry processing logic unit 213 may be embodied as any device or circuitry (e.g., a co-processor, an application specific integrated circuit (ASIC), etc.) to manage telemetry data obtained for components in the edge platform, such as the edge resources 150, 152, 154. For example, the telemetry processing logic unit 213 may be configured to manage security of the telemetry data through public key management. The telemetry processing logic unit 213 is also configured to manage telemetry data that is associated with a given service (e.g., based on metadata of the telemetry data indicative of a service type). The telemetry processing logic unit 213 is also configured to manage thermal telemetry data relative to a SLA associated with the edge resources 150, 152, 154. The sensor correlation logic unit 215 may be embodied as any device or circuitry (e.g., a co-processor, an application specific integrated circuit (ASIC), etc.) to manage sensor data obtained from multiple edge devices 110. The sensor correlation logic unit 215 is configured to identify patterns in sensor data to reduce noisy data being sent to other edge compute resources for further processing.

The compute engine 210 is communicatively coupled to other components of the edge gateway device 114 via the I/O subsystem 216, which may be embodied as circuitry and/or components to facilitate input/output operations with the compute engine 210 (e.g., with the processor 212 and/or the memory 214) and other components of the edge gateway device 114. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the memory 214, and other components of the edge gateway device 114, into the compute engine 210.

The communication circuitry 218 may be embodied as any communication circuit, device, or collection thereof, capable of enabling communications over a network between the edge gateway device 114 and another device (e.g., the edge device 110, the edge resources 150, 152, 154, devices in the core data center 190, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the edge gateway device 114 to connect with another compute device (e.g., the edge device 110, the edge resources 150, 152, 154, devices in the core data center 190, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge gateway device 114 at the board level, socket level, chip level, and/or other levels.

The one or more illustrative data storage devices 222 may be embodied as any type of devices configured for shortterm or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations (e.g., machine learning and artificial intelligence (AI) operations) faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision.

The edge resources 150, 152, 154 (e.g., other compute devices 160, 162, 164, 166, 168, 170), the edge device 110, the fog nodes 180, and devices in the core data center 190 may have components similar to those described in FIG. 2 with reference to the edge gateway device 114. The description of those components of the edge gateway device 114 is equally applicable to the description of components of the edge resources 150, 152, 154 (e.g., compute devices 160, 164, 168 and accelerator devices 162, 166, 170), the edge device 110, the fog nodes 180, and devices in the core data center 190. Further, it should be appreciated that any of the edge resources 150, 152, 154 (e.g., compute devices 160, 164, 168 and accelerator devices 162, 166, 170), the edge device 110, the edge gateway device 114, the fog nodes 180, and the devices in the core data center 190 may include other components, sub-components, and devices commonly found in a computing device, which are not discussed above in reference to the edge gateway device 114 and not discussed herein for clarity of the description. Further, it should be understood that one or more components of a compute device may be distributed across any distance, and are not necessarily housed in the same physical unit.

The edge gateway device 114, edge resources 150, 152, 154 (e.g., compute devices 160, 164, 168 and accelerator devices 162, 166, 170), the edge device 110, the fog nodes 180, and the core data center 190 are illustratively in communication via a network, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
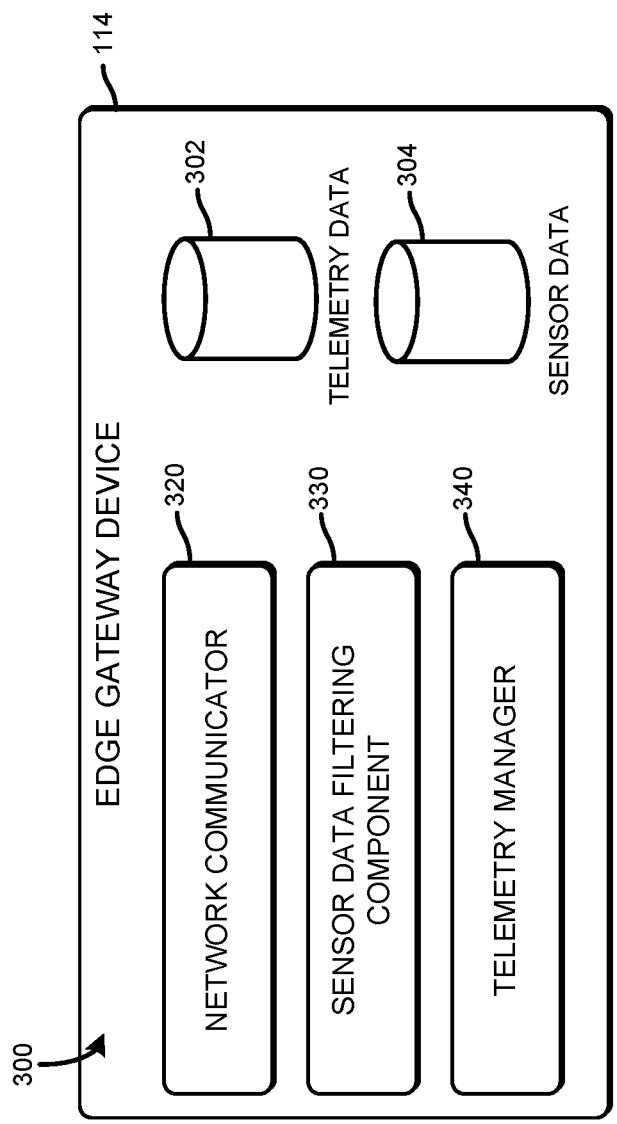
FIG. 3 is a simplified block diagram of at least one embodiment of an environment that may be established by the edge gateway device of FIGS. 1 and 2.

Referring now to FIG. 3, a device in the system 100, such as the edge gateway device 114, may establish an environment 300 during operation. The illustrative environment 300 includes a network communicator 320, a sensor data filtering component 330, and a telemetry manager 340. Each of the components of the environment 300 may be embodied as hardware, firmware, software, or a combination thereof. In some embodiments, one or more of the components of the environment 300 may be embodied as circuitry or a collection of electrical devices (e.g., network communicator circuitry 320, sensor data filtering component circuitry 330, telemetry manager circuitry 340, etc.).

The environment 300 also includes telemetry data 302, which may be embodied as any data collected from components in the system 100 (e.g., edge resources 150, 152, 154) indicative of telemetry of resources in those components. Examples of telemetry data 302 include cache utilization, memory utilization, bandwidth utilization, I/O per second, processor utilization, thermal load, and so on. Telemetry data 302 may be collected in the system 100 via a variety of techniques, such as using Intel® Resource Director Technology. Using such techniques, performance counters may be configured on each resource to monitor and collect the telemetry data 302. In an embodiment, the telemetry data 302 may include metadata specifying a particular service associated with the underlying resource and an identifier specifying a tenant of the underlying resource. The environment 300 also includes sensor data 304, which may be embodied as any data collected from sensors on edge devices 110. Example sensor data 304 includes LIDAR data, audio and video data, navigation data, temperature sensor data, barometric pressure data, elevation data, and so on. The sensor data 304 may include metadata including a type of sensor data, identifier of the edge device 110, timestamp, and so on.

In the illustrative embodiment, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the devices in the system 100. To do so, the network communicator 320 is configured to receive and process data packets from one system or computing device (e.g., an edge device 110) and to prepare and send data packets to another computing device or system (e.g., devices of edge resources 150, 152, 154, the edge or fog nodes 180, devices in the core data center 190, etc.). Accordingly, in some embodiments, at least a portion of the functionality of the network communicator 320 may be performed by the communication circuitry 218, and, in the illustrative embodiment, by the NIC 220.

The illustrative sensor data filtering component 330 is configured to receive and store sensor data 304 obtained from multiple edge devices 310. The sensor data filtering component 330 may then, by type of sensor data 304, identify one or more patterns of changes in the sensor data. For example, given a sequence of temperature sensor values, the sensor data filtering component 330 may identify that the sensor data 304 for edge devices 110 in a given area have a substantially similar value over a period of time. The sensor data filtering component 330 may determine which values to report over time based on the changes in the sensor data 304 over multiple edge devices 110 and filter sensor data 304 in cases where each value for a given type is substantially similar. The sensor data filtering component 330 may be configured to generate one or more machine learning models to identify patterns, such that subsequent patterns can be predicted.

The illustrative telemetry manager 340 is configured to receive and store telemetry data 302 for further processing. Further, the telemetry manager 340 is to authorize access to the telemetry data 302 by tenant. For example, the telemetry manager 340 may maintain access keys (e.g., encryption keys) associated with a given tenant and associated with an owner of a given set of edge resources. The telemetry manager 340 may sign telemetry data 302 using a private key of the owner for attestation of the telemetry data 302, and the telemetry manager 340 may also encrypt the data using a public key of a tenant associated with the underlying resources for telemetry data 302 to be accessed. The encryption keys may be managed by the device 114, e.g., in a secure co-processor, secure enclave, trusted platform module, and the like. The telemetry manager 340 is also configured to generate telemetry profiles indicative of one or more patterns identified in analyzed telemetry data 304 for a given service. Doing so allows an orchestrator in the system 100 to dynamically allocate resources based on the profile. The telemetry manager 340 is also configured to manage cooling schemes on edge resources to comply with SLA-specified cost requirements. For example, the telemetry manager 340 may, upon determining that thermal telemetry data for a given resource exceeds a threshold, determine whether certain cooling methods (e.g., activating available additional resources for a given workload) is within a thermal budget specified in a SLA. If so, then the telemetry manager 340 may perform such cooling methods. Otherwise, the telemetry manager 340 may notify an orchestrator on the system 100 of the resource exceeding the threshold.

Figure 4:
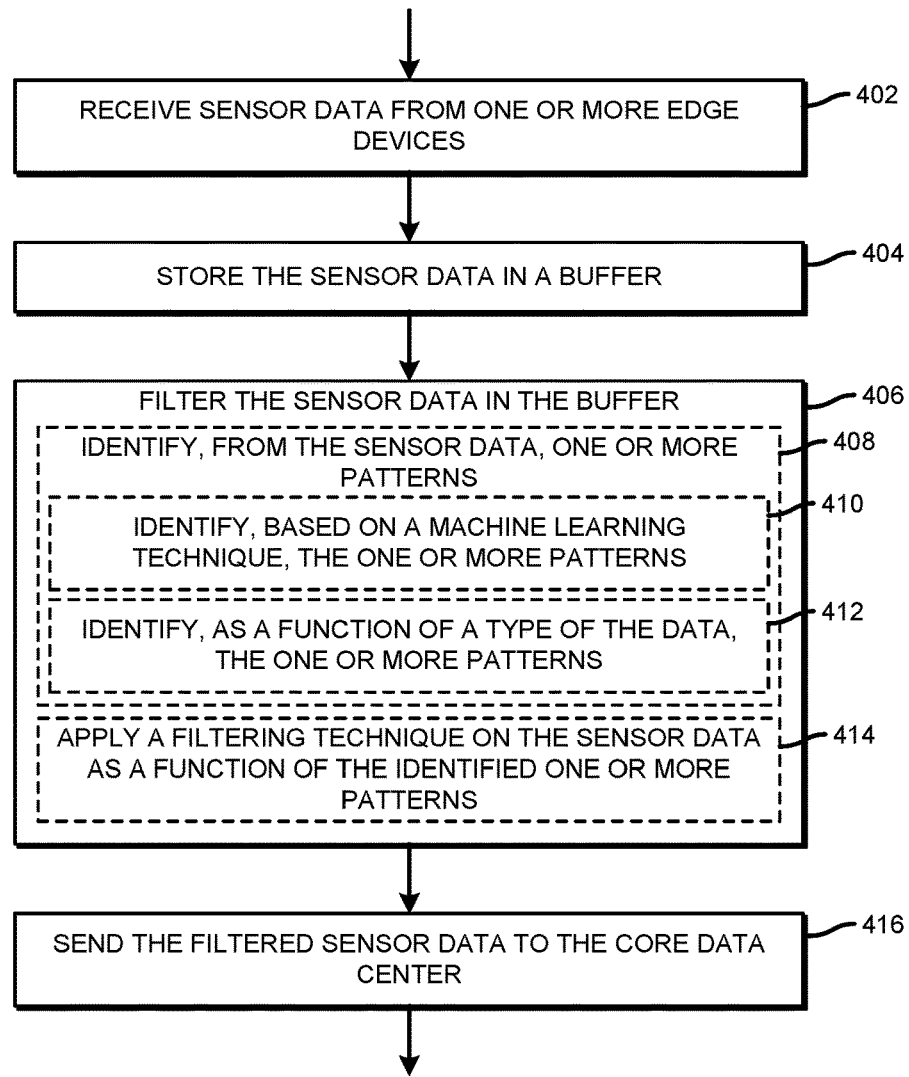
FIG. 4 is a simplified flow diagram of at least one embodiment of a method that may be performed by the edge gateway device of FIGS. 1 and 2 for managing sensor data in an edge platform.

Referring now to FIG. 4, a device in the system 100, such as the edge gateway device 114, in operation, performs a method 400 for managing sensor data in the edge platform. As shown, the method 400 begins in block 402, in which the edge gateway device 114 receives sensor data from one or more edge devices. As stated, the sensor data includes metadata indicating various characteristics thereof, such as an identifier of the edge device 110 from which the sensor data was collected, a timestamp, a type of the sensor data, and the like. In block 404, the edge gateway device 114 stores the sensor data in a buffer maintained by the edge gateway device 114. For instance, the edge gateway device 114 may store the sensor data in a buffer of one of the data storage devices 222.

In block 406, the edge gateway device 114 applies filters to the sensor data stored in the buffer. For instance, to do so, in block 408, the edge gateway device 114 identifies, from the sensor data, one or more patterns. In an embodiment, a pattern is indicative, for a given type of sensor data, a collection of historical values associated with the sensor over a particular period of time. The one or more patterns may be identified in various manners. For example, in block 410, the edge gateway device 114 identifies, using a machine learning technique, the one or more patterns. A machine learning technique may include using historical values as training data to generate a machine learning model. Another example may include performing principal component analysis. As another example of identifying patterns, in block 412, the edge gateway device 114 identifies, as a function of a type of the sensor data, the one or more patterns. As an example, assume that the edge gateway device 114 receives temperature sensor data from multiple edge devices 110. In such a case, the temperature sensor data may be relatively higher as the day progresses. The edge gateway device 114 may be configured to identify such patterns in the data based on the type, e.g., using specified configurations associated with that sensor data.

In block 414, the edge gateway device 114 applies a filtering technique on the sensor data as a function of the identified one or more patterns. For example, the edge gateway device 114 may remove duplicative sensor data from the buffer. As another example, the edge gateway device 114 may exclude outliers from concurrent sensor data from the multiple edge devices 110. As yet another example, the edge gateway device 114 may apply a mean or average calculation to the sensor data values over a given period of time. In block 416, the edge gateway device 114 sends the filtered sensor data to the core data center 190 (or to other devices in the edge platform, such as the fog or edge nodes 180).

Figure 5:
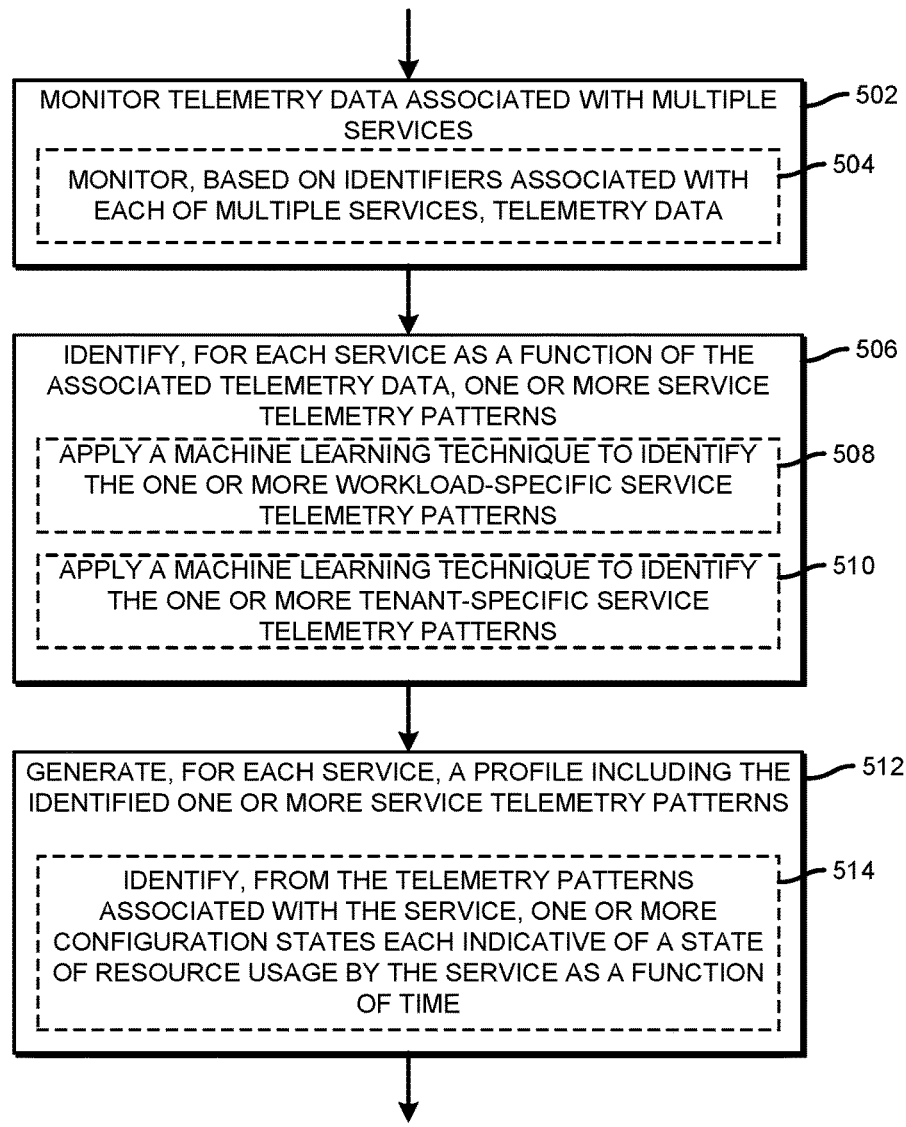
FIG. 5 is a simplified flow diagram of at least one embodiment of a method for identifying one or more telemetry patterns for a given service in an edge network.

Referring now to FIG. 5, a device in the edge platform such as the edge gateway device 114, in operation, may perform a method 500 for identifying one or more telemetry patterns for a given service in the edge platform. As shown, the method 500 begins in block 502, in which the edge gateway device 114 monitors telemetry data associated with multiple services. For example, in block 504, the edge gateway device 114 monitors, using identifiers (or other metadata) associated with each of multiple services, the telemetry data. Particularly, the telemetry data may be associated to a given process address space ID mapped to a given tenant. The telemetry is not only per platform but also towards disaggregated and local resources.

In block 506, the edge gateway device 114 identifies, for each service as a function of the associated telemetry data, one or more service telemetry patterns. Service-telemetry patterns might include telemetry patterns of various types, such as workload-specific telemetry patterns and tenant-specific telemetry patterns. Patterns may include one or more usage parameters (e.g., latency, bandwidth, throughput, etc.) that have relatively consistent measures during a given period of time or time of day for that workload or tenant. Workload-specific telemetry patterns may include usage patterns associated with a given workload (e.g., based on collected telemetry that includes an identifier associated with the workload). For instance, in block 508, the edge gateway device 114 applies a machine learning technique to identify one or more workload-specific service telemetry patterns. A workload-specific service telemetry pattern is a pattern that is indicative of resource usage and characteristics associated with a given workload (or service), regardless of an underlying tenant or service provider associated with the type of service. For example, the workload-specific service telemetry pattern may specify that memory utilization is high for a given service at a particular time of day. In block 510, the edge gateway device 114 may apply a machine learning technique to identify one or more tenant-specific service telemetry patterns. A tenant-specific service telemetry pattern may be indicative of resource usage and characteristics associated with a given workload (or service) for a given tenant. For example, the tenant-specific service telemetry pattern may indicate, for a given tenant-owned set of resources, that memory utilization is high for a service A but generally low for service B in the evening.

In block 512, the edge gateway device 114 generates, for each service, a profile including the identified one or more service telemetry patterns. The profile may include, for example, configuration states of the underlying resource that are determined based on the telemetry data (identified from the patterns) at a given time. In particular, in block 514, the edge gateway device 114 may identify, from the telemetry patterns associated with a given service, the configuration states, indicative of a resource usage by the service as a function of time. In some cases, a profile may be workload-specific (e.g., with configuration states determined based on the workload in general) or tenant-specific (e.g., with configuration states determined based on a workload for resources associated with the tenant).

Figure 6:
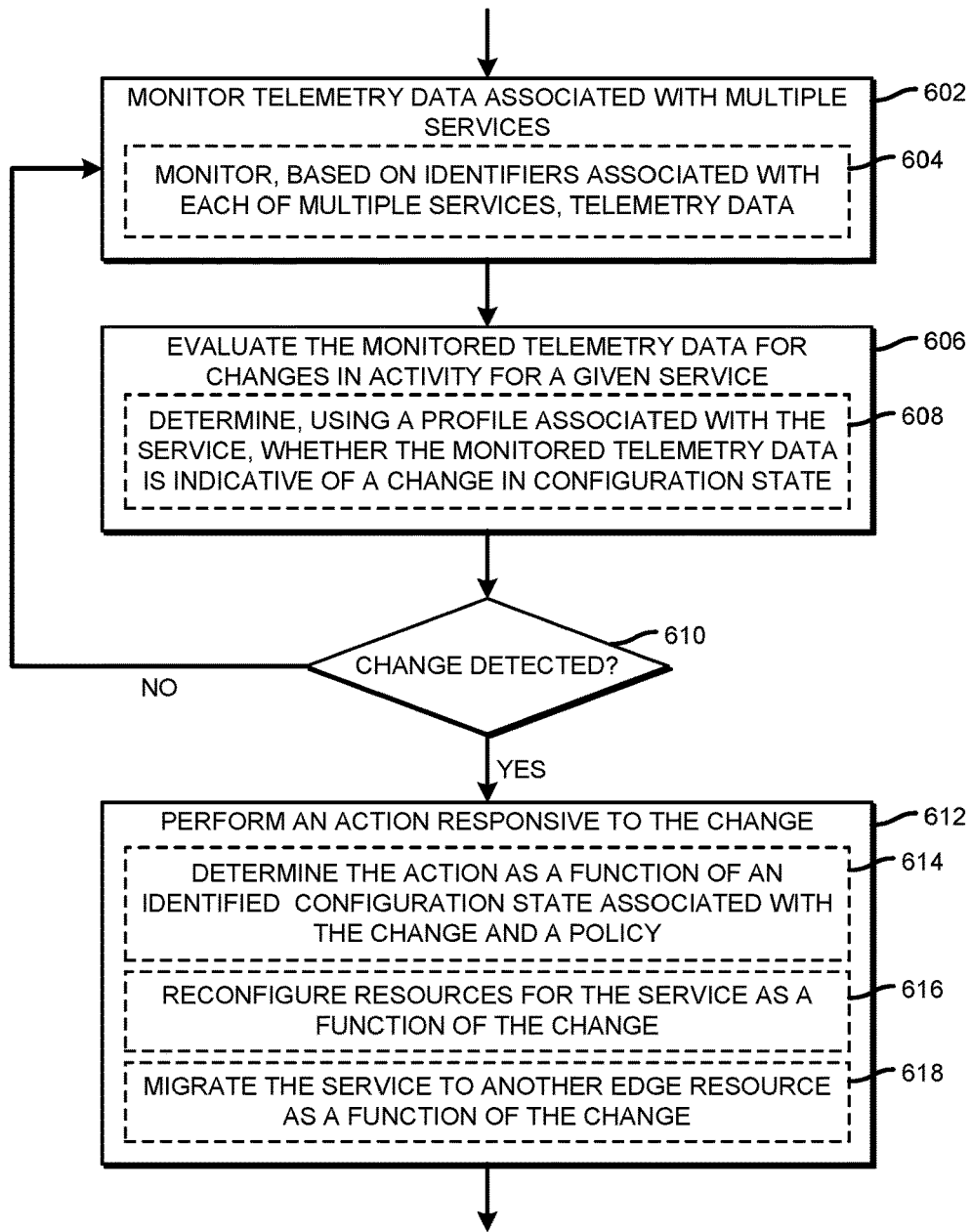
FIG. 6 is a simplified flow diagram of at least one embodiment of a method for processing service-aware telemetry in an edge network.

The generated profiles may be used to reorchestrate resources based on the configuration states of the resources at a given point in time. For example, referring now to FIG. 6, a device in the edge platform, such as the edge gateway device 114, in operation, may perform a method 600 for processing service-aware telemetry in an edge network, based in part on the generated profiles. As shown, the method 600 begins in block 602, in which the edge gateway device 114 monitors telemetry data associated with multiple services. Similar to block 504, in block 604, the edge gateway device 114 monitors, based on an identifier associated with each service, the telemetry data.

In block 606, the edge gateway device 114 evaluates the monitored telemetry data for changes in activity for a given service. For example, in block 608, the edge gateway device 114 may determine, using the generated profiles for that service, whether the monitored telemetry data is indicative of a change in configuration state for that service. In other cases, the edge gateway device 114 may determine whether a change in resource usage exceeds a given threshold.

In block 610, the edge gateway device 114 determines whether a change is detected. If not, then the method 600 returns to block 602. Otherwise, in block 612, the edge gateway device 114 performs an action responsive to the change. For instance, to do so, in block 614, the edge gateway device 114 determines the action as a function of an identified configuration state specified in the service profile and of a policy (e.g., a SLA or QoS policy). The determined actions may include a reconfiguration of resources for the service as a function of the change (block 616). For example, if resource usage for a content delivery network (CDN) service enters a configuration state in which resource usage drops below a certain threshold, the edge gateway device 114 may allocate resources away from that service to make the resources available to another service. Other examples of determined actions include migrating the service to another edge resource (e.g., another compute device or accelerator device within one of the edge resources 150, 152, 154) as a function of the change (block 618). For instance, if the resource usage for a CDN service enters a configuration state in which the resource usage exceeds a given threshold and the underlying resource does not have any compute capacity available to accommodate the resource usage, the edge gateway device 114 may initiate a migration process of the service to another compute device in the edge platform.

Figure 7:
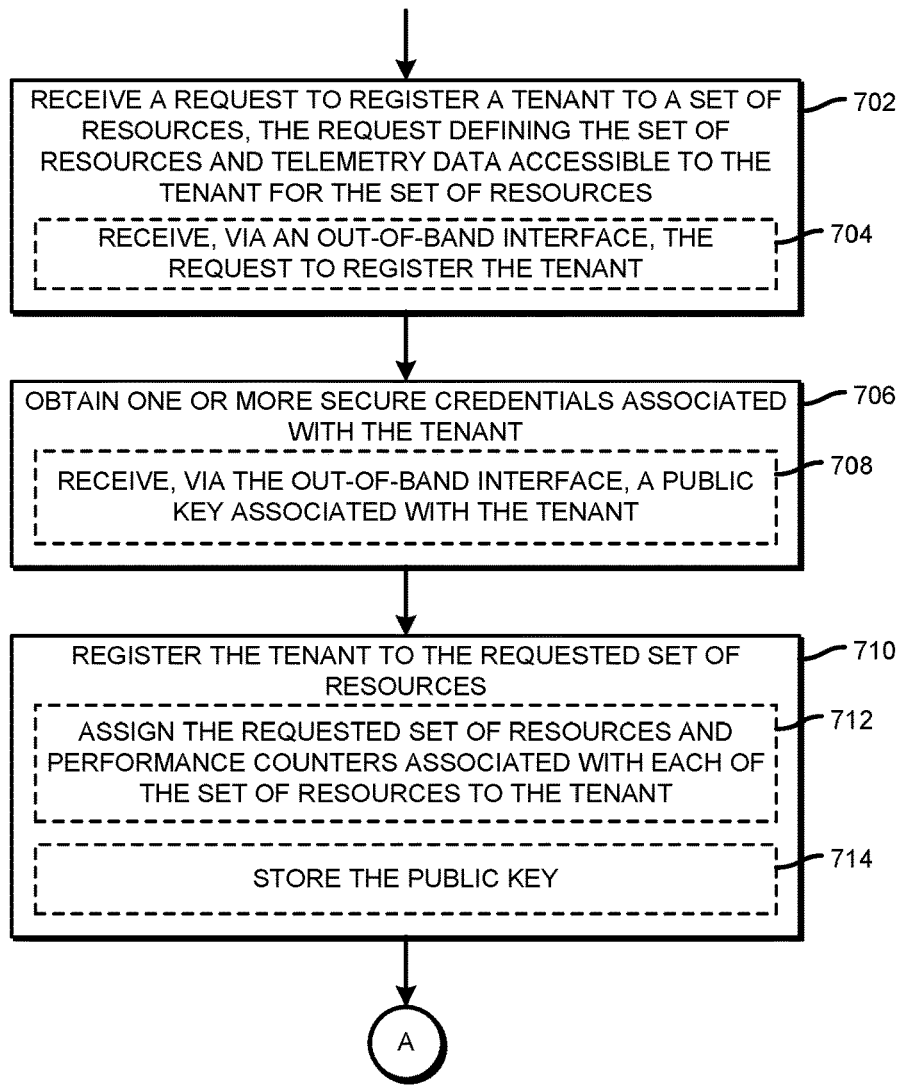
FIGS. 7 and 8 are simplified flow diagrams of at least one embodiment of a method for processing telemetry data for edge resources registered to a tenant in an edge network.
Figure 8:
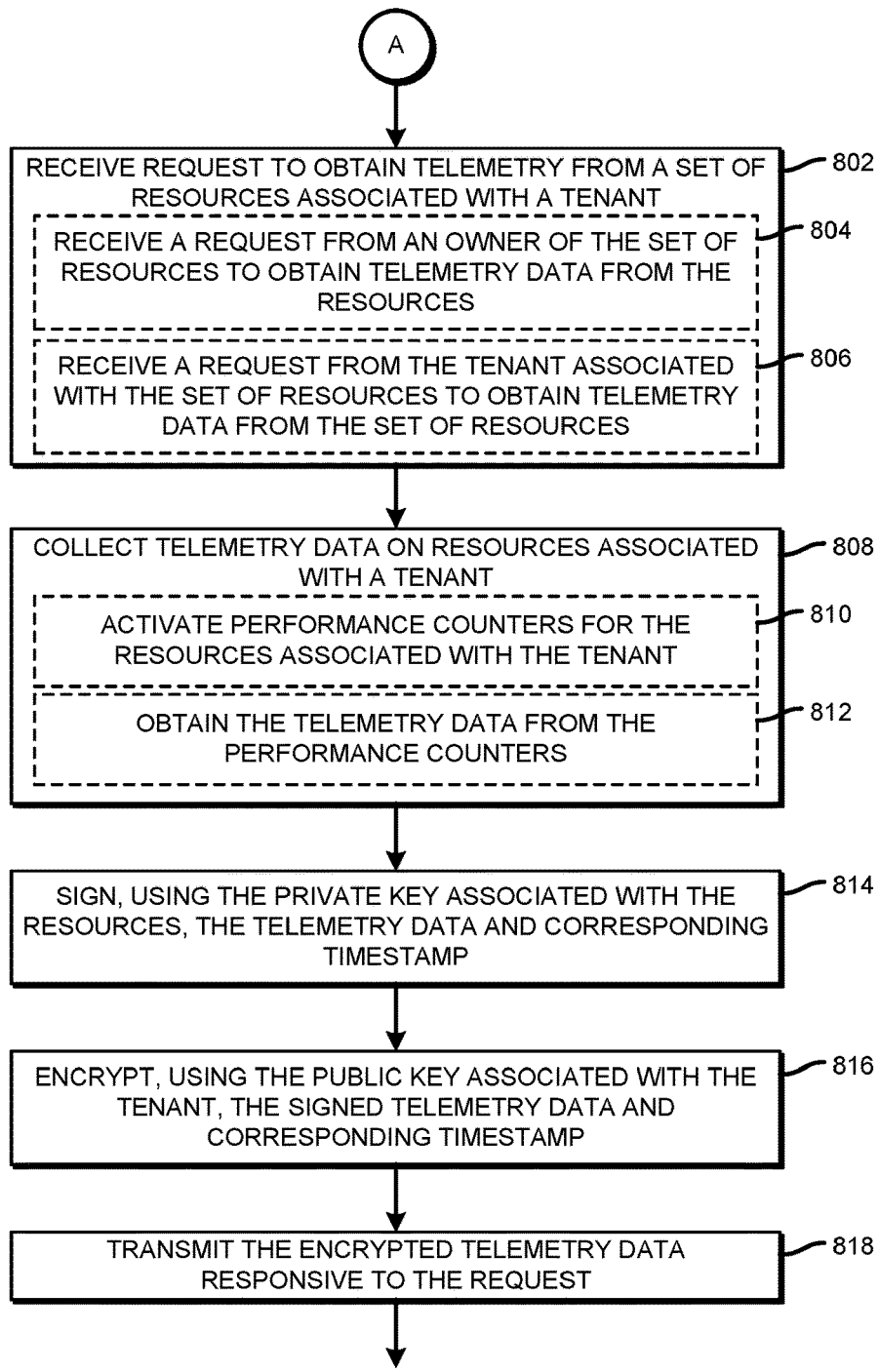

Referring now to FIGS. 7 and 8, a device in the edge platform such as the edge gateway device 114, in operation, may perform methods 700 and 800 for processing telemetry data for edge resources registered to a tenant in an edge network. Turning to FIG. 7, method 700 begins in block 702, in which the edge gateway device 114 receives a request to register a tenant to a set of resources. The request defines the set of resources and telemetry data accessible to the tenant for the set of resources. The request may be made by the owner of the set of resources. Further, in block 704, the request may be received via an out-of-band interface.

In block 706, the edge gateway device 114 obtains one or more secure credentials associated with the tenant. For example, in block 708, the edge gateway device 114 receives, via the out-of-band interface, a public key generated by the tenant and associated with the tenant. The public key may be used later to encrypt telemetry data for resources assigned to the tenant. In block 710, the edge gateway device 114 registers the tenant to the requested set of resources. Particularly, in block 712, the edge gateway device 114 assigns the requested set of resources and any performance counters associated with each of the set of resources to the tenant. In block 714, the edge gateway device 114 stores the public key in a data store associated with the edge gateway device 114 (e.g., one of the data storage devices 222 or some secure enclave).

Turning now to FIG. 8, the method 800 begins in block 802, in which the edge gateway device 114 receives a request to obtain telemetry data from a set of resources associated with a specified tenant. For example, in block 804, the edge gateway device 114 may receive, via an out-of-band interface, a request from an owner of the set of resources to obtain the telemetry data. In other cases, in block 806, the edge gateway device 114 may receive, via the out-of-band-interface, a request from the tenant registered with the set of resources.

In block 808, the edge gateway device 114 collects telemetry data on the resources associated with the tenant in response to the request. For instance, to do so, in block 810, the edge gateway device 114 may activate performance counters of the resources associated with the tenant. Thereafter, in block 812, the edge gateway device 114 obtains the telemetry data from the performance counters.

In block 814, the edge gateway device 114 signs, using the private key associated with the resources, the telemetry data and a corresponding timestamp (e.g., indicative of when the telemetry data was obtained, when the telemetry data was signed, etc.). The edge gateway device 114 may do so using a variety of signing methods. For example, the edge gateway device 114 may generate a digital signature using the private key. The signature ensures, to an entity, that the telemetry data originated from the desired resources. In block 816, the edge gateway device 114 encrypts, using the public key associated with the tenant, the signed telemetry data and the corresponding timestamp. The edge gateway device 114 may do so with various encryption methods using the public key. In block 818, the edge gateway device 114 transmits the encrypted telemetry data responsive to the request.

Figure 9:
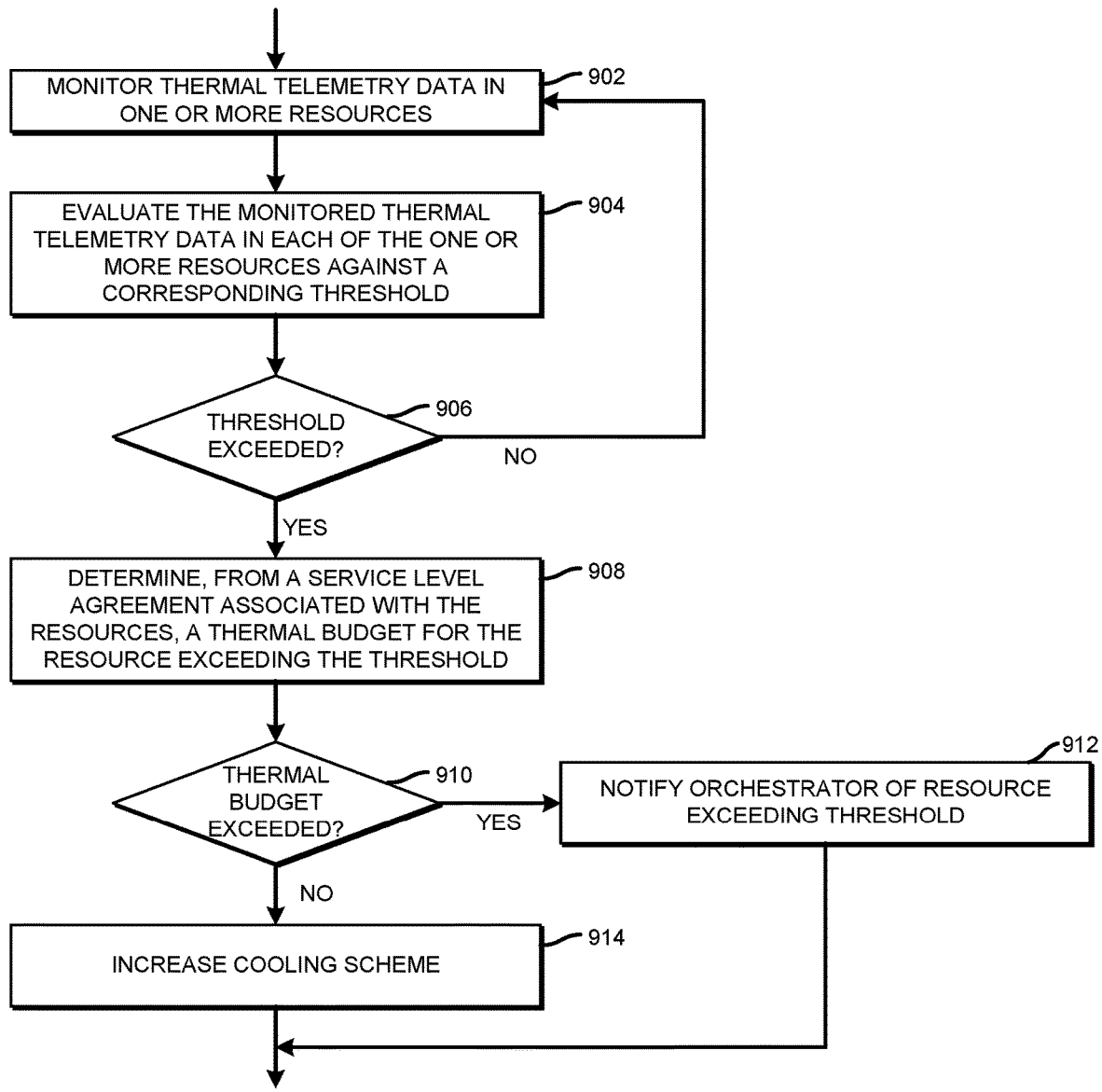
FIG. 9 is a simplified flow diagram of at least one embodiment of a method for managing edge resources based on observed thermal telemetry thereof in an edge network.

Referring now to FIG. 9, a device in the edge platform, such as the edge gateway device 114, in operation, may perform a method 900 for managing edge resources based on thermal telemetry thereof in the edge platform. In block 902, the edge gateway device 114 monitors thermal telemetry data in one or more edge resources. Thermal telemetry may include a temperature reported by thermal sensors configured in each of the edge resources or a rack in which the edge resources are located, for example.

In block 904, the edge gateway device 114 evaluates the monitored thermal telemetry data in each of the one or more resources against a corresponding threshold. The threshold may be indicative of a temperature measure at which, e.g., performance by the resource begins to degrade. If the threshold is not exceeded, then the method 900 returns to block 902. Otherwise, in block 908, the edge gateway device 114 determines, from a service level agreement associated with the resources, a thermal budget for the resource exceeding the corresponding threshold. More particularly, the SLA may specify a thermal budget for the resource. In addition, the edge platform may provide a mapping of costs to cooling actions to be performed to reduce thermal load on a given resource. The edge gateway device 114 may determine actions to be performed to reduce the thermal load and a corresponding cost.

In block 910, the edge gateway device 114 determines whether the thermal budget for the resource is exceeded based on the specified budget in the SLA. If so, then in block 912, the edge gateway device 114 notifies an orchestrator device in the edge platform (e.g., residing in the core data center 190). Doing so allows the orchestrator to determine other techniques for reducing the thermal workload on the resource. For example, the orchestrator may migrate an underlying service currently executing on the resource to another resource having availability. However, if the edge gateway device 114 determines that the thermal budget is not exceeded, the edge gateway device 114 may increase cooling schemes within the resource to reduce the thermal load, within the thermal budget specified in the SLA. For example, the edge gateway device 114 may reduce compute resources used in executing a given service such that thermal load is decreased but QoS requirements remain satisfied.

Figure 10:
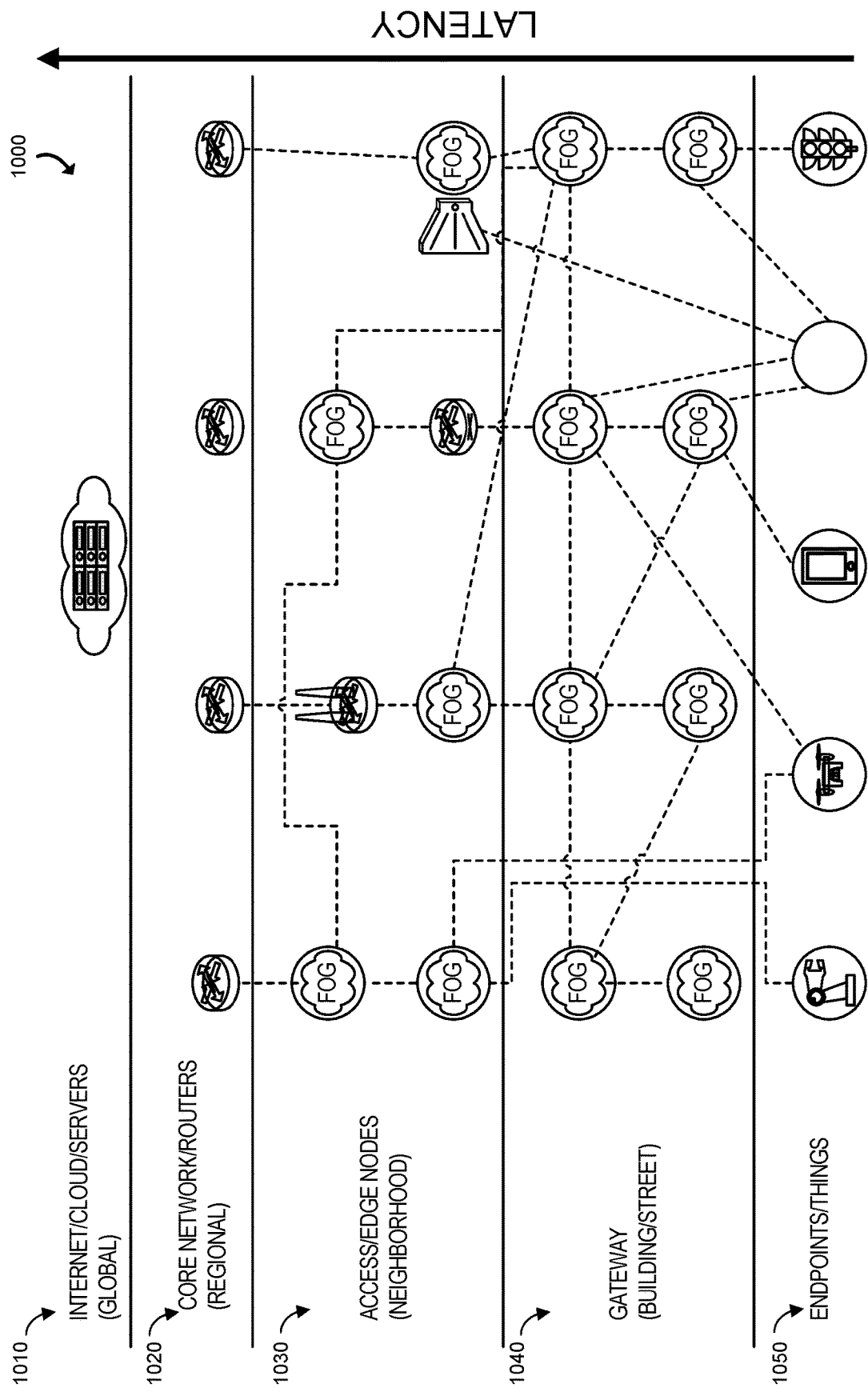
FIG. 10 is a simplified block diagram of a fog and mobile edge computing (MEC) network topology that may be utilized with the system of FIG. 1.

Referring briefly to FIG. 10, a MEC and fog network topology 1000 is shown. The network topology 1000 includes endpoints (at an endpoints/things network layer 1050), gateways (at a gateway layer 1040), access or edge computing nodes (e.g., at neighborhood nodes layer 1030), core network or routers (e.g., at a regional or central office layer 1020). A fog network (e.g., established at the gateway layer 1040) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE or 5G core network), among others. In this context, FIG. 10 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

EXAMPLES

Illustrative examples of the technologies disclosed herein are provided below. An embodiment of the technologies may include any one or more, and any combination of, the examples described below.

Example 1 includes a device comprising circuitry to monitor telemetry data associated with a plurality of services provided in an edge network; identify, for each of the plurality of services and as a function of the associated telemetry data, one or more service telemetry patterns; and generate a profile including the identified one or more service telemetry patterns.

Example 2 includes the subject matter of Example 1, and wherein the circuitry is further to evaluate, for one of the plurality of services, the monitored telemetry data for a change in activity; and upon a determination that the change in activity is detected, perform an action responsive to the change.

Example 3 includes the subject matter of any of Examples 1 and 2, and wherein to perform the action responsive to the change comprises to determine the action as a function of an identified configuration state associated with the change in activity and a policy.

Example 4 includes the subject matter of any of Examples 1-3, and wherein to perform the action responsive to the change further comprises to reconfigure, as a function of the change, resources assigned to the one of the plurality of services.

Example 5 includes the subject matter of any of Examples 1-4, and wherein to perform the action responsive to the change further comprises to migrate the one of the plurality of services to a second device.

Example 6 includes the subject matter of any of Examples 1-5, and wherein to monitor the telemetry data associated with a plurality of services provided in the edge network comprises to monitor the telemetry data for one or more resources registered to a tenant.

Example 7 includes the subject matter of any of Examples 1-6, and wherein the circuitry is further to store a public key associated with the tenant in a data store.

Example 8 includes the subject matter of any of Examples 1-7, and wherein the circuitry is further to sign, using a private key associated with the one or more resources, the telemetry data and a corresponding timestamp; and encrypt, using the public key associated with the tenant, the signed telemetry data and the corresponding timestamp.

Example 9 includes the subject matter of any of Examples 1-8, and wherein the circuitry is further to monitor thermal telemetry data in the one or more resources; evaluate the monitored thermal telemetry data in each of the one or more resources against a corresponding threshold; and upon a determination that the corresponding threshold is exceeded, determine, from a service level agreement associated with the resources, a thermal budget for the one or more resources.

Example 10 includes the subject matter of any of Examples 1-9, and wherein the circuitry is further to, upon a determination that the thermal budget is exceeded, notify an orchestrator device of the one or more resources exceeding the corresponding threshold.

Example 11 includes the subject matter of any of Examples 1-10, and wherein the circuitry is further to, upon a determination that the thermal budget is not exceeded, perform one or more cooling techniques on the one or more resources to reduce a thermal load thereon.

Example 12 includes the subject matter of any of Examples 1-11, and wherein the circuitry is further to receive sensor data from one or more edge devices connected with the edge network; store the sensor data in a data store; filter the stored sensor data; and send the filtered sensor data to a core data center in the edge network.

Example 13 includes the subject matter of any of Examples 1-12, and wherein to filter the stored sensor data comprises to identify, from the sensor data, one or more patterns; and apply a filtering technique on the sensor data as a function of the identified one or more patterns.

Example 14 includes the subject matter of any of Examples 1-13, and wherein to identify, from the sensor data, the one or more patterns comprises to identify, based on a machine learning technique, the one or more patterns.

Example 15 includes the subject matter of any of Examples 1-14, and wherein to identify, from the sensor data, the one or more patterns comprises to identify, as a function of a type of the sensor data, the one or more patterns.

Example 16 includes one or more machine-readable storage media storing a plurality of instructions, which, when executed, cause a device to monitor telemetry data associated with a plurality of services provided in an edge network; identify, for each of the plurality of services and as a function of the associated telemetry data, one or more service telemetry patterns; and generate a profile including the identified one or more service telemetry patterns.

Example 17 includes the subject matter of Example 16, and wherein to monitor the telemetry data associated with a plurality of services provided in the edge network comprises to monitor the telemetry data for one or more resources registered to a tenant, and wherein the circuitry is further to store a public key associated with the tenant in a data store; sign, using a private key associated with the one or more resources, the telemetry data and a corresponding timestamp; and encrypt, using the public key associated with the tenant, the signed telemetry data and the corresponding timestamp.

Example 18 includes the subject matter of any of Examples 16 and 17, and wherein the plurality of instructions further causes the device to monitor thermal telemetry data in the one or more resources; evaluate the monitored thermal telemetry data in each of the one or more resources against a corresponding threshold; upon a determination that the corresponding threshold is exceeded, determine, from a service level agreement associated with the resources, a thermal budget for the one or more resources; upon a determination that the thermal budget is exceeded, notify an orchestrator device of the one or more resources exceeding the corresponding threshold; and upon a determination that the thermal budget is not exceeded, perform one or more cooling techniques on the one or more resources to reduce a thermal load thereon.

Example 19 includes the subject matter of any of Examples 16-18, and wherein the plurality of instructions further causes the device to receive sensor data from one or more edge devices connected with the edge network; store the sensor data in a data store; identify, from the sensor data, one or more patterns; apply a filtering technique on the sensor data as a function of the identified one or more patterns; and send the sensor data with the filtering technique applied to a core data center in the edge network.

Example 20 includes a device comprising means for monitoring telemetry data associated with a plurality of services provided in an edge network; means for identifying, for each of the plurality of services and as a function of the associated telemetry data, one or more service telemetry patterns; and means for generating a profile including the identified one or more service telemetry patterns. In an example, the means for monitoring may be embodied as any device or circuitry configured to monitor telemetry data in an edge environment. In an example, the means for identifying may be embodied as any device or circuitry configured to identify service telemetry patterns. In an example, the means for generating a profile may be embodied as any device or circuitry for generating a profile including identified service telemetry patterns.

What is claimed is:

1. A device comprising:
   circuitry to:
   monitor telemetry data associated with a plurality of services provided in an edge network;
   identify, for each of the plurality of services and as a function of the associated telemetry data, one or more service telemetry patterns;
   generate a machine learning model to identify a first service telemetry pattern of change associated with a sensor data;
   predict a second service telemetry pattern based on the generated machine learning model;
   generate a profile including the first and second service telemetry patterns;
   evaluate, for one of the plurality of services, the monitored telemetry data for a change in activity relative to the first and second service telemetry patterns; and
   upon a determination that the change in activity is detected, perform an action responsive to the change.

2. The device of claim 1, wherein to perform the action responsive to the change includes to determine the action as a function of an identified configuration state associated with the change in activity and a policy.

3. The device of claim 1, wherein to perform the action responsive to the change further includes to reconfigure, as a function of the change, resources assigned to the one of the plurality of services.

4. The device of claim 1, wherein to perform the action responsive to the change further includes to migrate the one of the plurality of services to a second device.

5. The device of claim 1, wherein to monitor the telemetry data associated with the plurality of services provided in the edge network includes to monitor the telemetry data for one or more resources registered to a tenant.

6. The device of claim 5, wherein the circuitry is further to store a public key associated with the tenant in a data store.

7. The device of claim 6, wherein the circuitry is further to:
   sign, using a private key associated with the one or more resources, the telemetry data and a corresponding timestamp; and
   encrypt, using the public key associated with the tenant, the signed telemetry data and the corresponding timestamp.

8. The device of claim 5, wherein the circuitry is further to:
   monitor thermal telemetry data in the one or more resources;
   evaluate the monitored thermal telemetry data in each of the one or more resources against a corresponding threshold; and
   upon a determination that the corresponding threshold is exceeded, determine, from a service level agreement associated with the resources, a thermal budget for the one or more resources.

9. The device of claim 8, wherein the circuitry is further to, upon a determination that the thermal budget is exceeded, notify an orchestrator device of the one or more resources exceeding the corresponding threshold.

10. The device of claim 8, wherein the circuitry is further to, upon a determination that the thermal budget is not exceeded, perform one or more cooling techniques on the one or more resources to reduce a thermal load thereon.

11. The device of claim 1, wherein the circuitry is further to:
receive sensor data from one or more edge devices connected with the edge network;
store the sensor data in a data store;
filter the stored sensor data; and
send the filtered sensor data to a core data center in the edge network.

12. The device of claim 11, wherein to filter the stored sensor data, the circuitry is to:
identify, from the sensor data, one or more patterns; and
apply a filtering technique on the sensor data as a function of the identified one or more patterns.

13. The device of claim 12, wherein to identify, from the sensor data, the one or more patterns, the circuitry is to identify, based on a machine learning technique, the one or more patterns.

14. The device of claim 12, wherein to identify, from the sensor data, the one or more patterns, the circuitry is to identify, as a function of a type of the sensor data, the one or more patterns.

15. One or more machine-readable storage media storing a plurality of instructions, which, when executed, cause a device to:
monitor telemetry data associated with a plurality of services provided in an edge network;
identify, for each of the plurality of services and as a function of the associated telemetry data, one or more service telemetry patterns;
generate a machine learning model to identify a first service telemetry pattern of change associated with a sensor data;
predict a second service telemetry pattern based on the generated machine learning model;
generate a profile including the first and second service telemetry patterns;
evaluate, for one of the plurality of services, the monitored telemetry data for a change in activity relative to the first and second service telemetry patterns; and
upon a determination that the change in activity is detected, perform an action responsive to the change.

16. The one or more machine-readable storage media of claim 15, wherein to monitor the telemetry data associated with a plurality of services provided in the edge network includes to monitor the telemetry data for one or more resources registered to a tenant, and wherein the plurality of instructions, when executed, cause the device to:
store a public key associated with the tenant in a data store;
sign, using a private key associated with the one or more resources, the telemetry data and a corresponding timestamp; and
encrypt, using the public key associated with the tenant, the signed telemetry data and the corresponding timestamp.

17. The one or more machine-readable storage media of claim 15, wherein the plurality of instructions, when executed, cause the device to:
monitor thermal telemetry data in the one or more resources;
evaluate the monitored thermal telemetry data in each of the one or more resources against a corresponding threshold;
upon a determination that the corresponding threshold is exceeded, determine, from a service level agreement associated with the resources, a thermal budget for the one or more resources;
upon a determination that the thermal budget is exceeded, notify an orchestrator device of the one or more resources exceeding the corresponding threshold; and
upon a determination that the thermal budget is not exceeded, perform one or more cooling techniques on the one or more resources to reduce a thermal load thereon.

18. The one or more machine-readable storage media of claim 15, wherein the plurality of instructions, when executed, cause the device to:
receive sensor data from one or more edge devices connected with the edge network;
store the sensor data in a data store;
identify, from the sensor data, one or more patterns;
apply a filtering technique on the sensor data as a function of the identified one or more patterns; and
send the sensor data with the filtering technique applied to a core data center in the edge network.

19. A device comprising:
means for monitoring telemetry data associated with a plurality of services provided in an edge network;
means for identifying to:
identify, for each of the plurality of services and as a function of the associated telemetry data, one or more service telemetry patterns;
generate a machine learning model to identify a first service telemetry pattern of change associated with a sensor data; and
predict a second service telemetry pattern based on the generated machine learning model; and
means for generating a profile including the identified first and second service telemetry patterns;
means for evaluating, for one of the plurality of services, the monitored telemetry data for a change in activity relative to the first and second service telemetry patterns; and
means for performing, upon a determination that the change in activity is detected, an action responsive to the change.

* * * * *